United States Patent
Claus et al.

(10) Patent No.: US 10,808,843 B2
(45) Date of Patent: Oct. 20, 2020

(54) METALLIC FLAT GASKET

(71) Applicant: REINZ-DICHTUNGS-GMBH, Neu-Ulm (DE)

(72) Inventors: Oliver Claus, Laichingen (DE); Georg Egloff, Weissenhorn (DE)

(73) Assignee: Reinz-Dichtungs GmbH, Neu-Ulm (DE)

( * ) Notice: Subject to any disclaimer, the term of this patent is extended or adjusted under 35 U.S.C. 154(b) by 144 days.

(21) Appl. No.: 15/777,528

(22) PCT Filed: Nov. 15, 2016

(86) PCT No.: PCT/EP2016/077679
§ 371 (c)(1),
(2) Date: May 18, 2018

(87) PCT Pub. No.: WO2017/085044
PCT Pub. Date: May 26, 2017

(65) Prior Publication Data
US 2018/0328490 A1 Nov. 15, 2018

(30) Foreign Application Priority Data
Nov. 20, 2015 (DE) .................... 20 2015 106 338 U

(51) Int. Cl.
*F16J 15/06* (2006.01)
*F16J 15/08* (2006.01)

(52) U.S. Cl.
CPC ......... *F16J 15/064* (2013.01); *F16J 15/0818* (2013.01); *F16J 15/0825* (2013.01); *F16J 2015/0868* (2013.01)

(58) Field of Classification Search
CPC .... F16J 15/064; F16J 15/0818; F16J 15/0868; F16J 2015/0868
(Continued)

(56) References Cited

U.S. PATENT DOCUMENTS 4,121,543 A * 10/1978 Hicks, Jr. ............... F02M 27/02
                                                         123/3
6,098,597 A    8/2000 Warmoth et al.
(Continued)

FOREIGN PATENT DOCUMENTS

DE         2700911 A1    7/1977
DE    102007019946 A1   10/2008
(Continued)

OTHER PUBLICATIONS

European Patent Office, International Search Report with written opinion issued in PCT/EP2016/077679, dated Feb. 1, 2017, 11 pages, European Patent Office Rijswijk Netherlands.

*Primary Examiner* — Nicholas L Foster
(74) *Attorney, Agent, or Firm* — Marshall & Melhorn, LLC

(57) ABSTRACT

A metallic flat gasket having a through-opening which is covered by a sieve element is described. The gasket serves for sealing a line transition between two components and for capturing particles in the fluid flowing through the line. At leat one metallic layer of the flat gasket has at least two continuations, which extend from the edge of a through-opening into the region of the through-opening, the at least two continuations being curved such that at least two of the continuations merge into each other in one plane or are connected together.

17 Claims, 9 Drawing Sheets

(58) Field of Classification Search
USPC .......................................................... 277/918
See application file for complete search history.

(56) References Cited

U.S. PATENT DOCUMENTS

| | | | | |
|---|---|---|---|---|
| 6,374,803 | B1* | 4/2002 | Warmoth | B01D 29/27 |
| | | | | 123/447 |
| 7,549,413 | B1* | 6/2009 | Sharpton | F02M 29/04 |
| | | | | 123/593 |
| 9,518,659 | B2* | 12/2016 | Egloff | B32B 15/02 |
| 10,088,048 | B2* | 10/2018 | Claus | F16L 23/003 |
| 2014/0090343 | A1* | 4/2014 | Egloff | F16J 15/0825 |
| | | | | 55/487 |
| 2014/0346106 | A1* | 11/2014 | Anzai | F16J 15/122 |
| | | | | 210/483 |
| 2015/0060352 | A1* | 3/2015 | Yoder | F16J 15/122 |
| | | | | 210/456 |
| 2016/0363223 | A1* | 12/2016 | Schoellhammer | F16J 15/064 |
| 2017/0037970 | A1* | 2/2017 | Schollhammer | F16J 15/0818 |
| 2017/0204973 | A1* | 7/2017 | Claus | B01D 46/16 |
| 2018/0252309 | A1* | 9/2018 | Blersch | F16K 15/023 |
| 2018/0306337 | A1* | 10/2018 | Blersch | F16K 15/144 |

FOREIGN PATENT DOCUMENTS

| | | |
|---|---|---|
| DE | 102009010385 A1 | 9/2010 |
| DE | 202014102014 U1 | 5/2014 |
| DE | 202014005866 U1 | 7/2015 |
| FR | 1275059 A | 11/1961 |
| JP | 2012149558 A | 8/2012 |

* cited by examiner

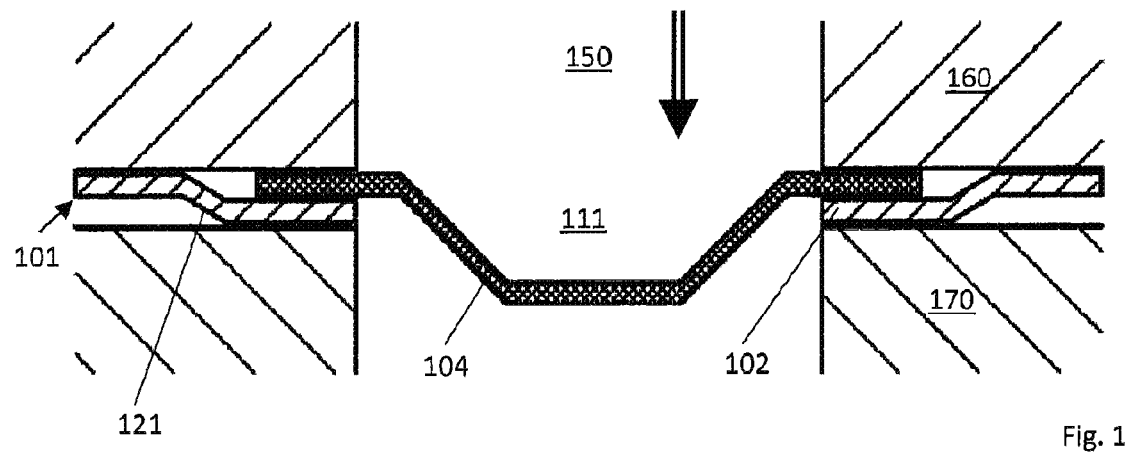
Fig. 1
PRIOR ART
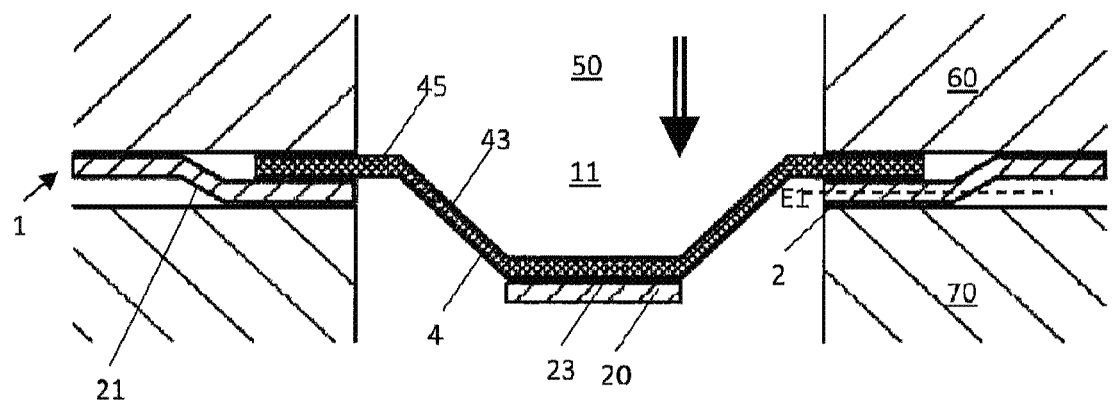
Fig. 2-a
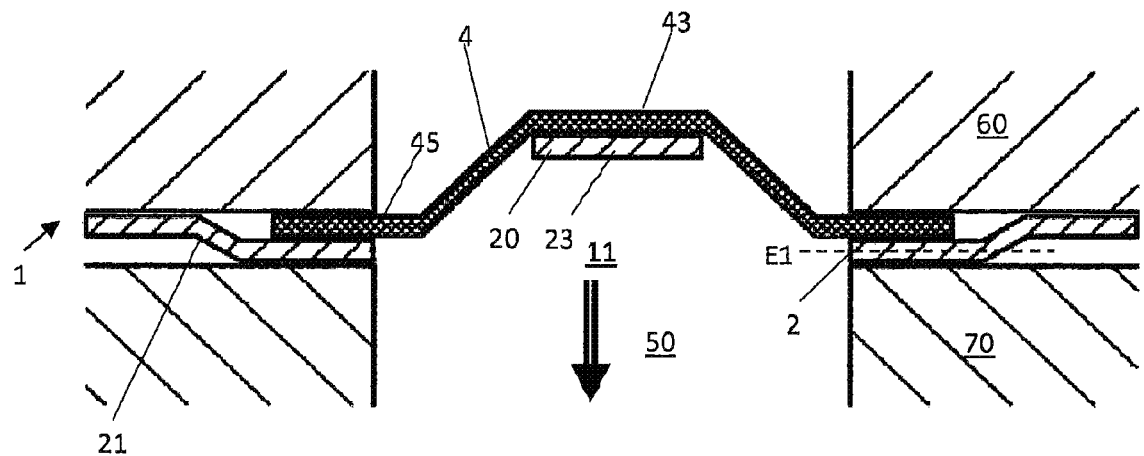
Fig. 2-b

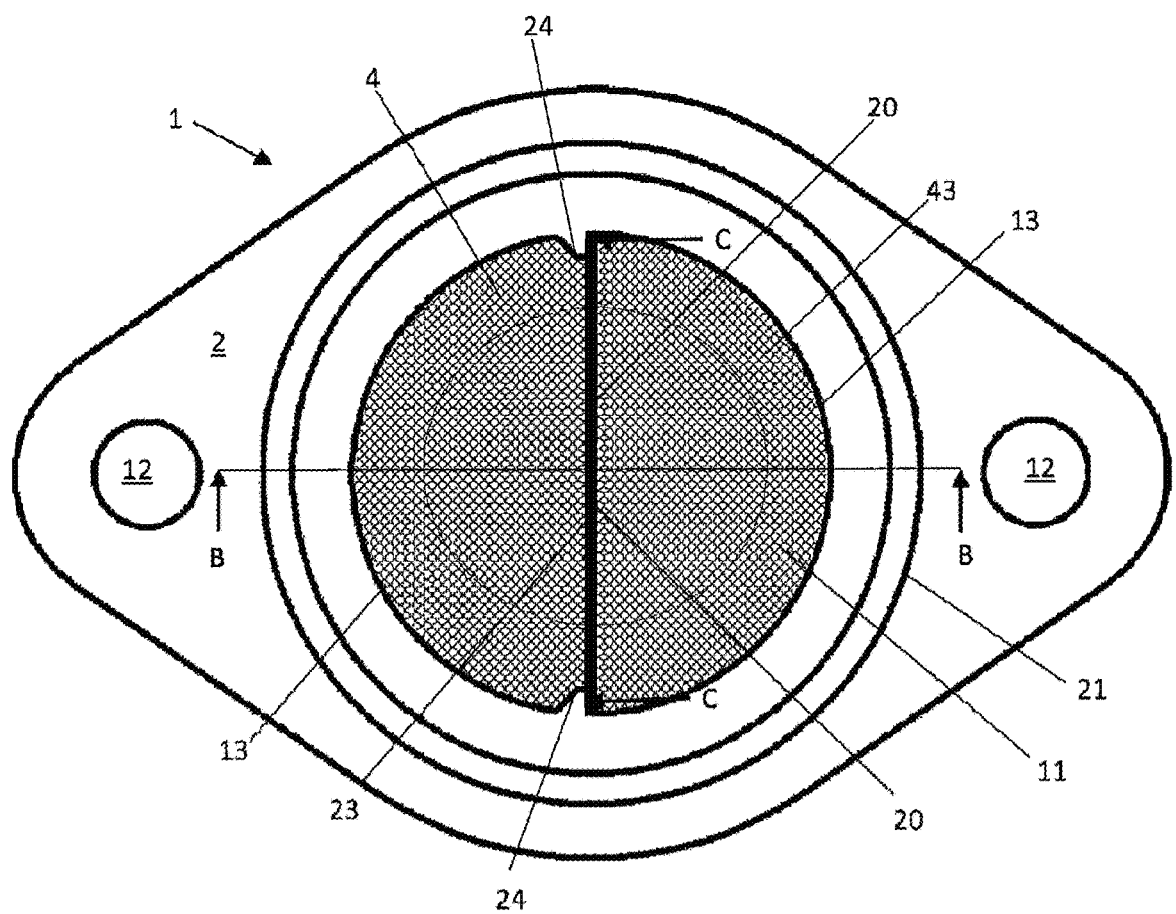
Fig. 3-a
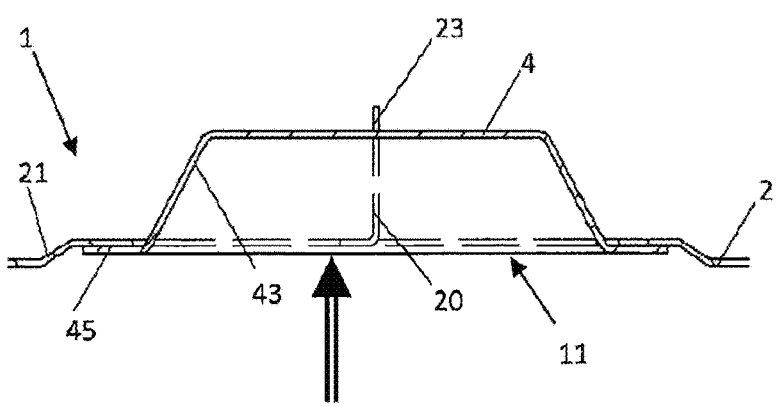
Fig. 3-b
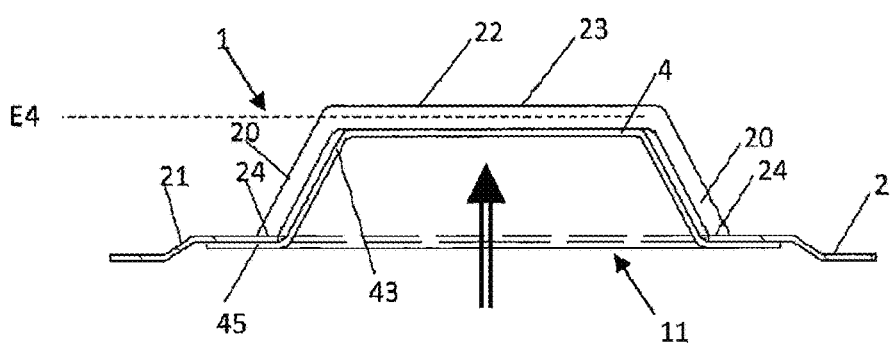
Fig. 3-c

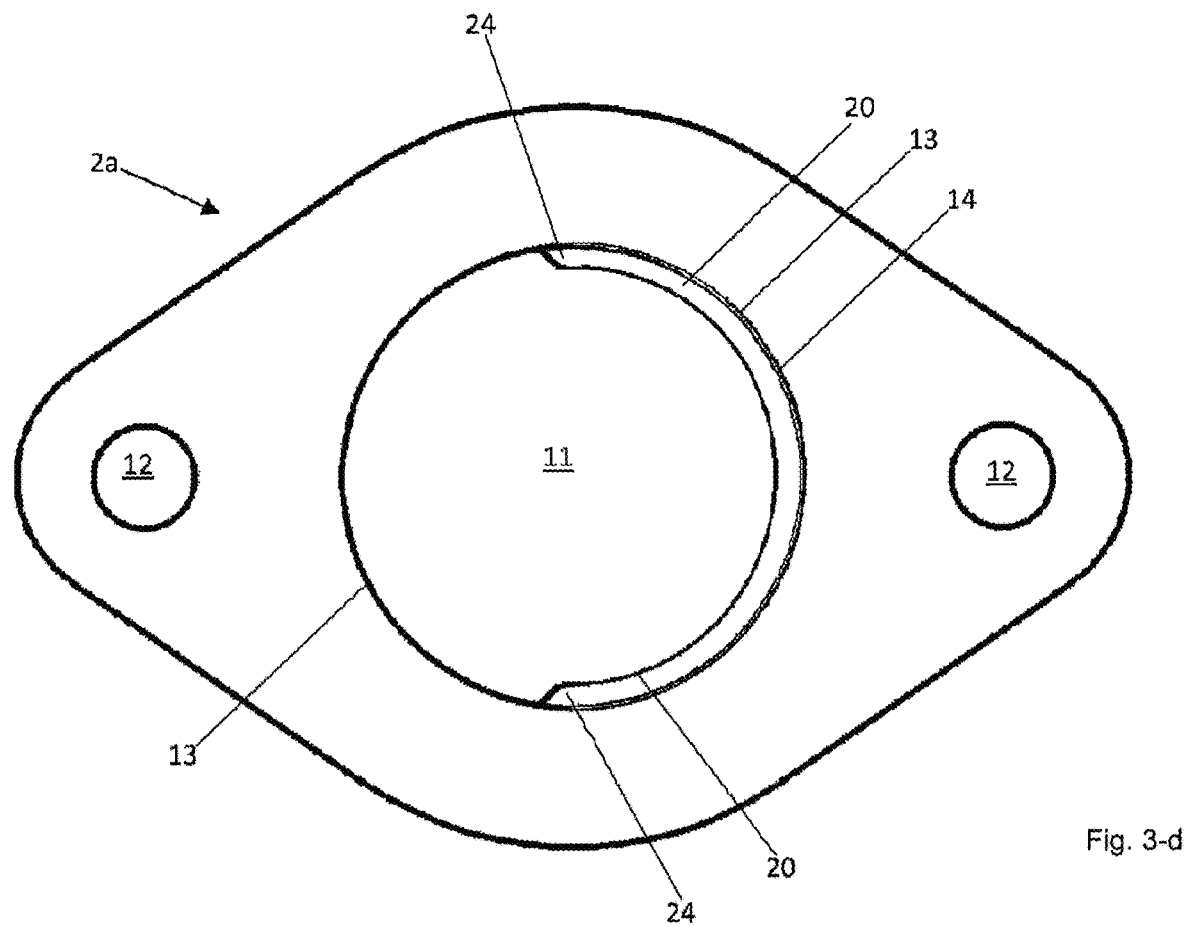
Fig. 3-d
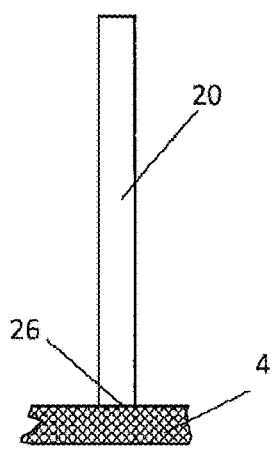
Fig. 4-a
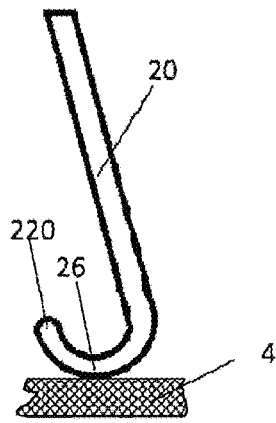
Fig. 4-b
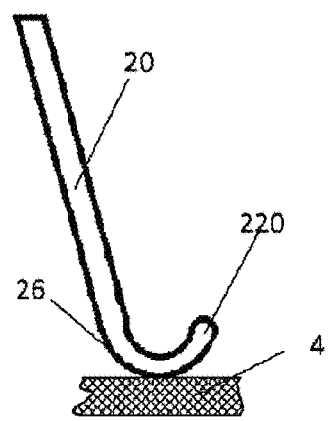
Fig. 4-c

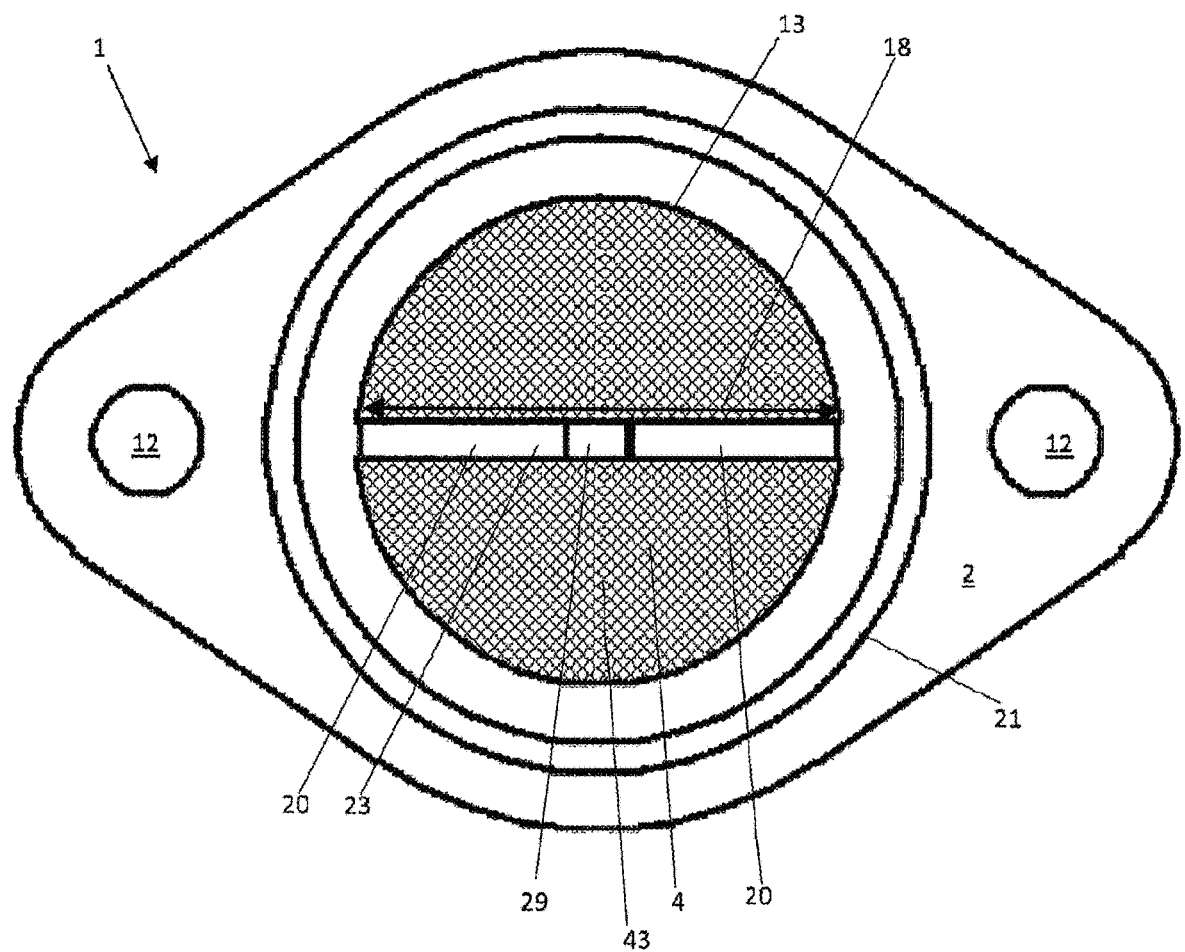
Fig. 6-a
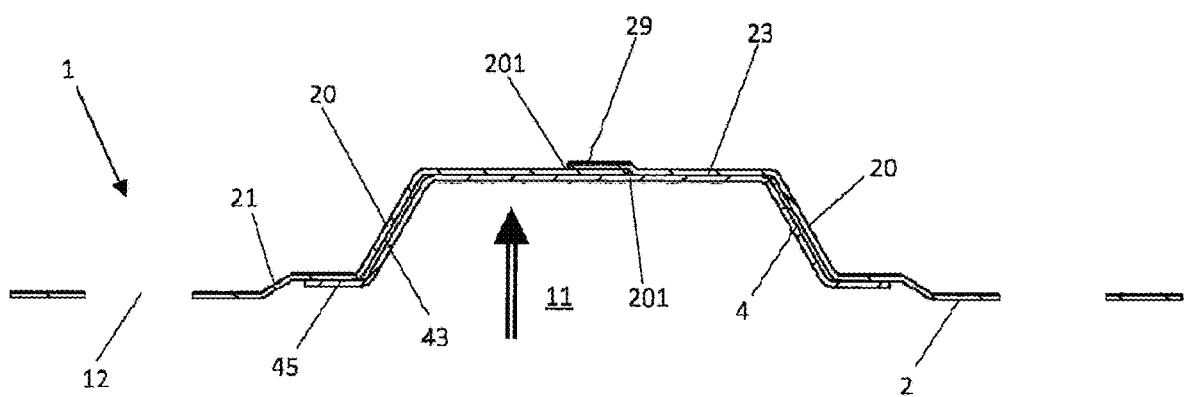
Fig. 6-b

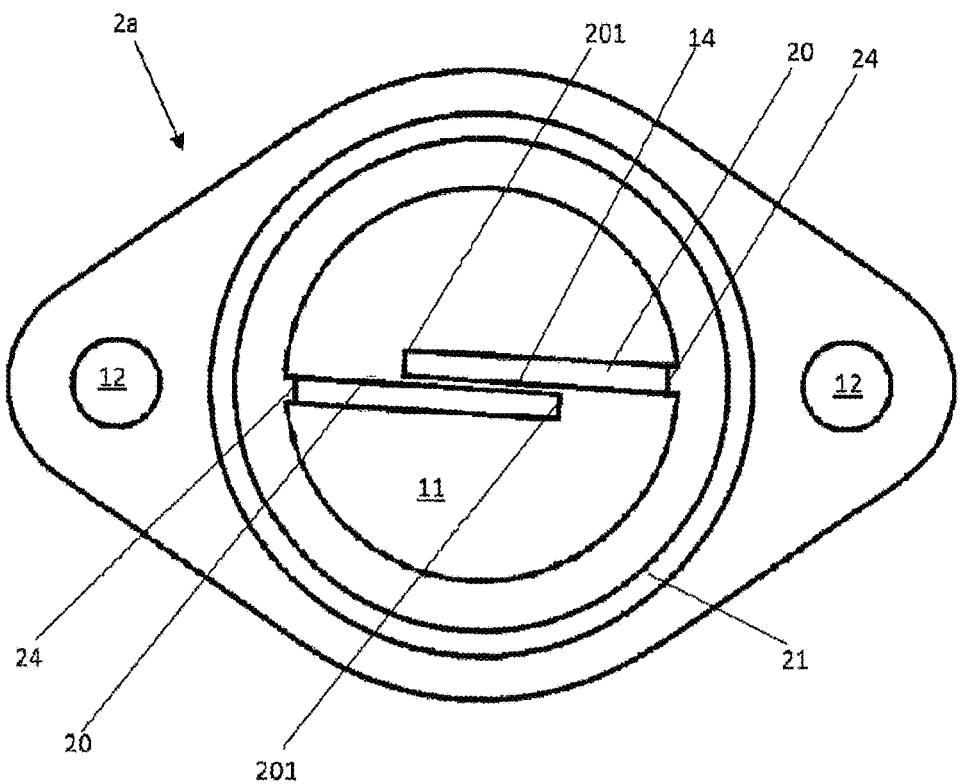
Fig. 6-c
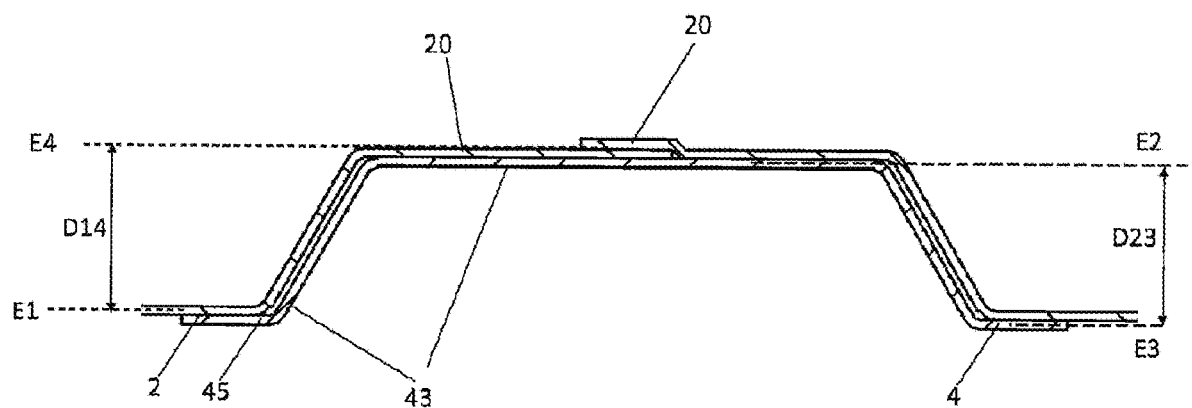
Fig. 7

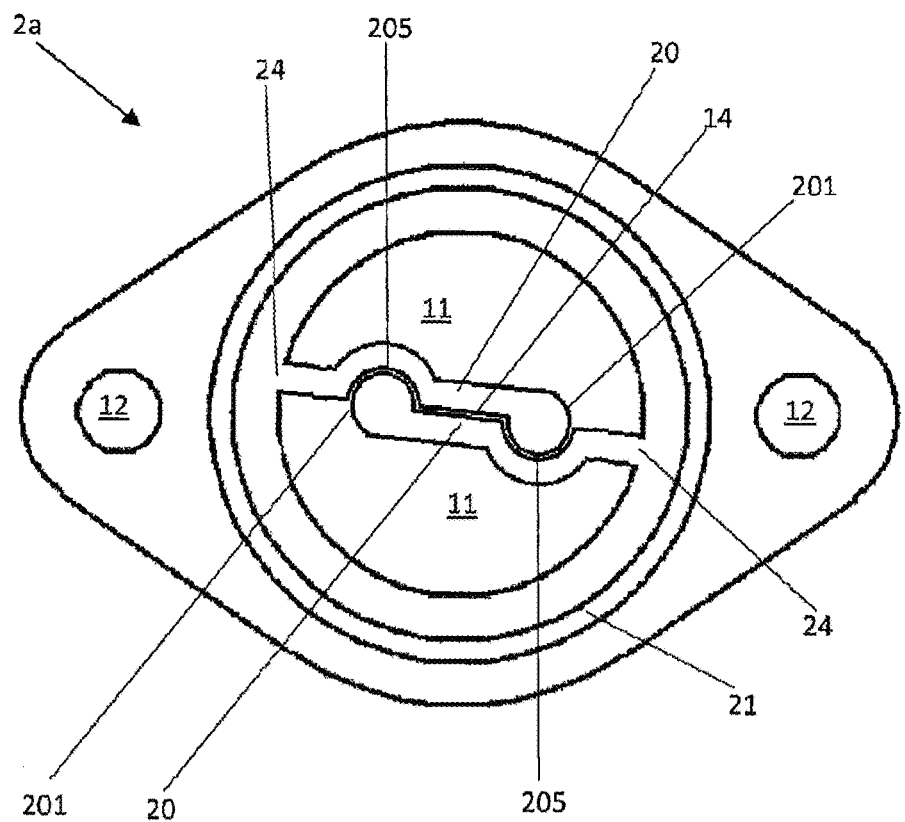
Fig. 8-a
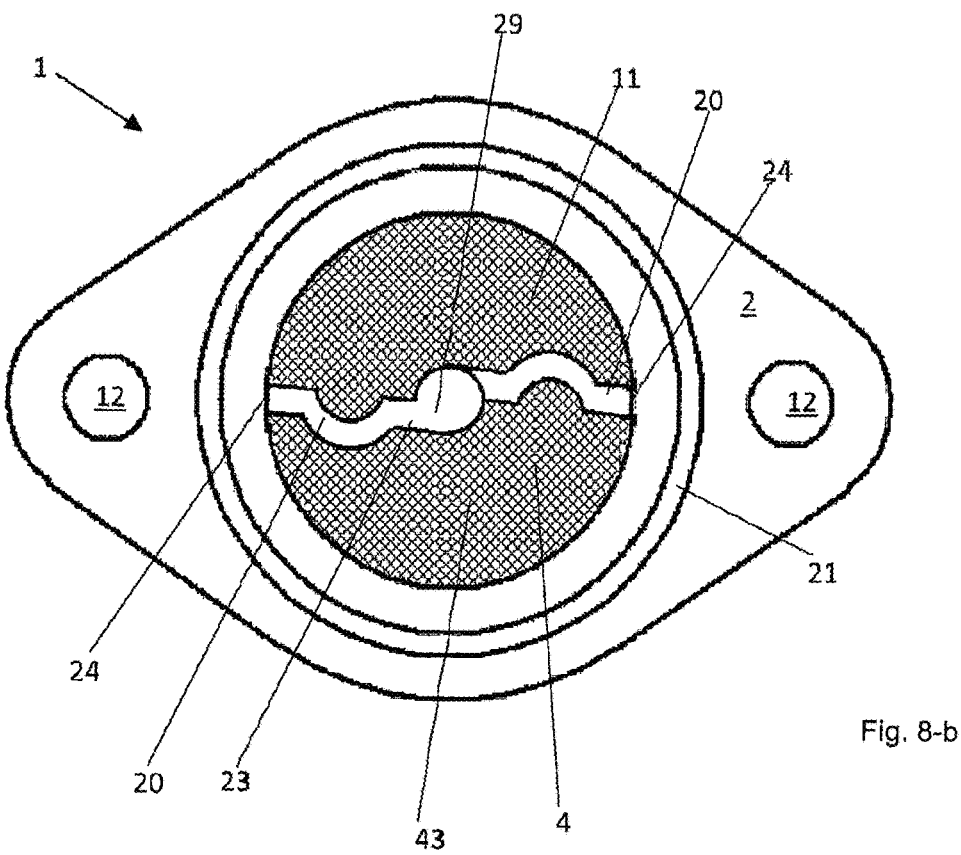
Fig. 8-b

METALLIC FLAT GASKET

BACKGROUND OF THE INVENTION

The present invention relates to a metallic flat gasket having a through-opening which is covered by a sieve element. Hence, the gasket serves, on the one hand, for sealing a conduct transition between two components and, on the other hand, for capturing particles which the fluid flowing through this conduct comprises.

In the state of the art, attempts have been made to provide gaskets with a sieve effect such that a complete sealing layer made of a sieve material, in particular a woven material, was incorporated in the gasket between at least two sheet metal layers and the regions surrounding the filter areas were filled with a sealing material, for example an elastomer, as is described in DE 10 2007 019 946 A1. Corresponding filters are usable, because of the filling material, only within a very restricted temperature range, i.e. are not suitable for hot gas applications. In addition, the production process of the multilayer gasket is very complex.

Likewise, it has been attempted to produce gaskets with sieves by the holes of the sieve being introduced directly into the sealing layer, for example by etching or by means of a laser, as is described for example in DE 10 2009 010 385 A1. This ensures good stability of the sieve layer. However, frequently holes are hereby produced which are too large. In addition, the methods are very time-consuming so that the gaskets cannot be produced in the required cycle times and within the permitted cost framework.

In addition, the constructional space available for the filtering is often very small since the cross-sectional area of the fluid passage to be filtered is very small. In addition, the filter elements configured only in the plane of the gasket cause an impermissibly high pressure loss in the conducted-through fluid. DE 10 2009 010 385 A1 shows embodiments in which the sealing layer, in the filter region, is shaped out of the layer like a cylinder so that not only the base area of the cylinder but also the side walls produced by the shaping are available as filter area so that also the pressure loss is reduced. In addition to the already previously mentioned disadvantages of this approach for filter integration, there can also be added here that the shaping of the material leads to a reduction in the sheet metal thickness in the relevant regions, as a result of which the sheet metal no longer has sufficient structural rigidity.

The same applies for the filter pots made of a woven filter material, mentioned in DE 20 2014 102 014 U1, in which the woven filter material is connected to a layer of a metallic flat gasket via a clamping ring or by folding over edge regions of sealing layer and filter element one over the other. The freely projecting woven sieve material here does not have sufficient structural rigidity to avoid stretching due to the high pressures and temperatures of the throughflowing fluid. Uncontrolled enlarged mesh widths of the sieve element and hence an uncontrolled filter effect are the result.

Recently, in gaskets with a filter insert produced from woven wire, it has been taken into account consequently that gaskets were produced with filter pots in which, in addition to an embossed, in particular beaded, sealing layer and a simple deep-drawn filter pot made of a woven wire, also in addition a likewise deep-drawn frame-shaped support element is provided with which the filter pot is retained in position even with large applied fluid pressures. The complex double deep-drawing process is necessary here since both the bottom of the filter pot and the frame of the support element are bent significantly out of the plane of the flat gasket, more precisely out of the plane of the sealing layer in the surroundings of the filter element, in order, on the one hand, to produce the required filter area and, on the other hand, to ensure sufficient support effect of this filter pot. In addition to the material of the beaded sealing layer, the material of the support element made of a deep-drawable sheet metal material is required since no permanent elastic sealing elements can be embossed into the deep-drawable sheet metal without further treatment.

There have also already been approaches to date to produce gaskets with a curved filter element made of non-deep-drawable sheet metal, such as e.g. in DE 20 2014 005 866 U1. In the solution there, the filter element consists of a "double pot" sieve, a sieve which is curved counter to the flow direction and back, which requires very intense shaping. In particular in the case of small to average sieve areas, this shaping is not possible with a reproducible mesh width.

SUMMARY OF THE INVENTION

It is hence the object of the invention to provide a metallic flat gasket having at least one sealing layer in which a sieve element is integrated, which offers, on the one hand, an adequate throughflow area but, on the other hand, also a reproducible mesh width. Furthermore, the use of additional deep-drawable sheet metal materials is intended to be dispensed with. The seal is intended to be ensured permanently. The gasket is intended to consist of as few components as possible and to be producible with processes which are as simple as possible.

The solution to this object is achieved with the metallic flat gasket according to claim 1. Preferred developments are revealed in the sub-claims.

The invention hence relates to a metallic flat gasket having at least one metallic layer, namely a sheet metal layer. This at least one layer has at least one through-opening which is covered by a filter element. Apart from these through-openings, the metallic layer can be configured as a closed sheet metal layer, in particular as a pore-free or mesh-free sheet metal layer. The at least one metallic layer extends, in the region thereof directly adjacent to the through-opening, in a first plane. The sieve element consists of a mesh material or comprises this. The sieve element does not thereby have a flat configuration but has a curved portion which is curved up to a second plane. The curved portion is surrounded annularly by an edge portion which extends, at least in portions, however preferably completely, circumferentially about the curved portion in a third plane. The second plane is thereby different from the third plane. In the at least one metallic layer, at least two continuations are configured, which extend from the edge of the through-opening into the region of the through-opening, the at least two continuations are thereby respectively curved such that at least two of the continuations in a fourth plane merge into each other or are connected to each other. This fourth plane is different from the first plane.

The at least two continuations can thereby be configured such that they are connected together in portions, with formation of at least one support portion, i.e. for example are connected together in the region of their free ends. Likewise, it is possible that in fact at least two continuations protrude out of the edge of the through-opening of the at least one metallic layer of the flat gasket, however these continuing in pairs one in the other integrally. The at least one support portion then consists therefore of material formed without interruption from the sheet metal layer although the support portion has a greater length, because of its curvature, than the direct connection of the regions of the at least one metallic layer in which the associated continuations arch upward from the edge or the plane of the through-opening.

The metallic flat gasket can be provided with precisely one support portion which spans the through-opening. However, it can also have more than one support portion, the support portions then respectively connecting the edges of the through-opening and spanning the through-opening. It is thereby preferred respectively that the curved portion of the sieve element does not float freely over its entire area but is supported, at least in portions, on the at least one support portion, with formation of at least one inner contact region. The at least one support portion hence prevents the filter element from stretching and the mesh size of the filter element changing. The at least one support element is hence always disposed in the flow direction of the fluid to be filtered behind the filter element.

Also outside the through-opening, namely in the region of its edge portion extending in the third plane, it is advantageous if the sieve element is supported, at least in portions, however preferably is supported circumferentially, on the at least one metallic layer and thereby forms an outer contact portion. Advantageously, the sieve element and the at least one metallic layer are connected in this edge region. A connection portion is thereby formed. The connection can be effected for example integrally, in particular by means of welding. The connection can be effected thereby both circumferentially e.g. in the form of a continuous weld seam, or in portions, e.g. in the form of individual weld points. Preferably, the welding is effected thereby by laser. Also positive form-fitting connections are possible, e.g. via knobs and/or ribbing in the sheet metal layer or by means of clinching outside the region which is relevant for the sealing.

For the seal, the metallic flat gasket is preferably provided with at least one sealing element moulded in the at least one metallic layer, at least one sealing element of which completely surrounds the through-opening. The sealing element is configured in particular as a bead, generally a stepped bead, i.e. a half bead, being advantageous for spatial reasons. In addition, a support element, i.e. in particular in portions, or alternatively also periodic sealing elements are possible.

The support portions of metallic flat gaskets according to the invention can be shaped from deep-drawable metals, i.e. metals with low tensile strength, directly as one-piece arcs. However such materials do not allow simultaneous durable shaping of embossed sealing elements in the relevant sheet metal layer, but require a complex hardening process before an elastic sealing element can be moulded durably. The solution according to the invention relates therefore preferably only to those metallic flat gaskets in the case of which the at least one support portion is formed in the sheet metal layer which consists of steel or a nickel-based alloy or comprises this and has a tensile strength which is at least 900 N/mm$^2$, preferably at least 1,100 N/mm$^2$, in particular at least 1,350 N/mm$^2$. The tensile strength relates thereby not only to the finished state of the entire gasket but in particular to the state at the time of moulding of the elastic sealing element. Even higher tensile strengths are preferred in principal. The stretching limit of these materials which is less than 22% is in addition adequate for the shaping required here. The tensile strengths thereby relate to new gaskets. During operation, the gaskets are often heated very intensely in order to burn off carbon black so that the mentioned tensile strengths in the case of used gaskets are then still provided only in the edge reasons of the gasket which are not subjected to the high temperatures.

Consequently, the continuations forming the at least one support portion outside any possibly present bent regions, for instance at the transition from the region surrounding the through-opening into the continuations or at other places of great change of direction and/or outside any possibly present connection regions, in which e.g. a weld seam is present, advantageously have no significant structure changes. In the continuations—outside the two mentioned regions—the screen sizes of the metal sheet hence correspond advantageously to those of the metal sheet in the region surrounding the through-opening up to the beginning of the sealing elements. Deep-drawn support portions differ significantly herefrom since, in these, an elongation of the screen sizes in the direction of the deep-drawing is provided, i.e. predominantly in the extension direction of the continuations.

In a first embodiment of the metallic flat gasket according to the invention, at least two continuations extend continuously with formation of at least one arc and thus form a support portion.

A first variant of this first embodiment is distinguished by the at least one metallic layer having precisely one support portion which consists of precisely one continuous arc, hence having therefore precisely two continuations. If this arcuate support portion projects into the first plane, then it has a maximum width over its entire course which corresponds at most to twice, preferably at most to one and a half times, the sheet metal thickness of the at least one metallic layer. For this purpose, the two continuations respectively have precisely one connection region in which they protrude from the sheet metal layer at the edge of the through-opening. In their respective connection region, the continuations respectively have a deflection by 80° to 100° out of the first plane. For this purpose, an arcuate element, in particular at the edge of the through-opening, is cut free, whilst maintaining the two connections of the continuations to the remaining sheet metal layer and is shaped in the two connection regions such that this arcuate element extends outside the connection regions essentially perpendicular to the sheet metal layer in the region surrounding the though-opening.

A second variant of this first embodiment of a metallic flat gasket according to the invention comprises, in contrast, a plurality of support portions with respectively one continuous arc. Again the two continuations forming an arcuate support portion have respectively one connection region. Here, the continuations are not however deflected quite so greatly out of the first plane; the continuations are deflected, in their connection region, respectively by 45° to 90° out of the first plane. For example, analogously to the first variant, again in particular at the edge of the through-opening, now two arcuate elements are cut free, whilst maintaining the respective connections of the continuations to the remaining sheet metal layer, and are shaped in the respective connection regions such that these two arcuate elements extend outside of the connection regions transversely relative to the sheet metal layer. With respect to the support effect of the support portions, it is hereby advantageous if these extend in a region in which the curvature of the filter element is pronounced, i.e. in a region with a large spacing between second and third plane. In addition, it is further advantageous if the deflection angle in the connection regions has a small difference from 90° since hence, upon projection of the arcuate support portions into the first plane, a smaller maximum width of the support portion results than with small deflection angles so that a smaller proportion of the sieve element is covered or sealed by the support element.

In a second embodiment of a metallic flat gasket according to the invention, no or only a small deflection of the continuations in the connection regions is effected. Consequently, the area of the continuations forming the support portion transversely relative to the extension direction of the continuations extends essentially parallel to the first plane or spans with the first plane an angle of −25° to 25°. This has the result that the at least one support portion, upon projection into the first plane, has a minimum width over its entire course which corresponds at least to five times, preferably at least to eight times, the sheet metal thickness of the at least one metallic layer. The width of the support portion can thereby change in the course of the support portion. The continuations are hereby configured such that they have a free end. They are advantageously cut free from the sheet metal layer, more precisely from the region of the sheet metal layer forming the through-opening, such that they have a length which corresponds to more than half the diameter of the through-opening. In particular section geometries are hereby advantageous in which two portions forming respectively one continuation extend adjacently in portions, for example parallel to each other or with a parallel main extension direction.

For formation of a support portion, at least two continuations overlap in portions in this embodiment. The connection is then effected preferably in the region of this overlap. Both, integral connections, in particular by means of (laser) welding, and positive form-fitting connections, in particular by folding the free ends one over the other or by means of a connection means, in particular by means of a rivet, can hereby be used. Integral connections are in particular particularly advantageous when an integral connection between the sieve element and the at least one metallic layer is effected also in the outer contact portion.

If the at least one support portion has precisely two continuations, then an arcuate support portion is also produced in this second embodiment. The second embodiment also however makes possible support portions with more complex shapes, for instance multi-ray stars or an annular element which is continued over two or more ray-shaped elements from the edge of the at least one metallic layer. The metallic flat gasket hereby has more than two continuations, the continuations being connected together preferably via branches. Here also, the respective continuations are cut free continuously from the material of the through-opening in the at least one metal layer, whilst maintaining a connection.

For further stabilisation, it is possible that the filter element and the at least one support portion are connected together integrally in portions, in particular in the inner contact region. This can be achieved easily by means of laser welding, in particular in the second embodiment.

In order to have available as large a filter area as possible, it is advantageous if the second plane and the third plane of the sieve element have as large a spacing as possible. At the same time, the material of the sieve element must be deformed only within narrowly defined limits. As a result, the spacing between the second and third plane is advantageously between 15% and 55% of the smallest spacing of the side edges of the through-opening. Also the at least one support portion must only seal a limited area proportion of the sieve element in order to guarantee a durable reliable filtration of the medium passing through. For this purpose, upon projection of the total area of the at least one support portion into the first plane, the total area of the support portion is at most 10%, preferably at most 5%, of the area of the sieve element projected into this plane. Here, in particular the first variant of the first embodiment is distinguished by very small and hence advantageous overlaps. In particular as a function of the geometry of the bodies to be sealed mutually, in particular of lines, for example exhaust gas lines of an internal combustion engine, the geometry of the through-opening can be chosen differently. In addition to circular, oval and elliptical shapes, also square through-openings, in particular rectangular through-openings, are possible, the corners of course being rounded off.

In the choice of the material of the sieve element, stability of the sieve element and fluid passage must be coordinated to each other. Advantageously, the sieve element consists, at least in portions, of a screen web, preferably however of a screen web over the entire area. The woven material thereby consists in particular of a steel wire, preferably a stainless steel wire. A sieve element which consists only in portions of a woven filter has for example a folded-over outer frame made of solid sheet metal.

In this context, it is advantageous if the sieve element of the metallic flat gasket in the edge portion and outside the connection portion, has a wire thickness of 0.04 to 0.2 mm, preferably of 0.05 to 0.15 mm.

For trapping particles from the fluid, the mesh width of the sieve element is crucial above all. For plain woven material, it applies, in particular in the region of the steepest rise of the sieve element in the intermediate region between the second and third plane, that the filter element preferably has a mesh width of 0.03 to 0.5 mm, particularly preferably of 0.08 to 0.3 mm. Mesh widths of 0.15 to 0.22 mm are thereby particularly preferred. Also a plurality of layers of a woven material, in particular of a plain woven material, can be combined, placed one upon the other, to form a single sieve element. In the case of more complex woven materials, such as for instance twill woven materials, it has been shown that the best filter results are achieved, with simultaneous moderate pressure drop, if the sieve element within a square area with 10 mm side edge length has no mesh of a mesh width greater than 0.2 mm.

Preferably, the sieve element is compressed at its outer edge, at least in portions, in particular compressed circumferentially. As a result, it can be ensured that individual wires of the sieve do not detach and contaminate the conducted-through fluid for their part.

The metallic flat gasket can have a multilayer configuration, an embodiment can hereby also combine at least a steel sheet with a metal sheet made of a nickel-based alloy. Multilayer, in particular two-layer, embodiments are advantageous in particular if the sieve element has a large thickness, it is hereby preferred if beads are configured in two sheet metal layers which have in total a bead height which is greater than the thickness of the sieve element. However, it is preferred if the metallic flat gasket consists merely of one sheet metal layer. In addition to lower costs, there are also advantages produced here in particular from the lower thermal resistance between the components, in particular when sealing between components made of aluminium alloys.

The metallic flat gasket is used in particular as gasket in the field of hot gases, preferably for exhaust gas recirculation of internal combustion engines. The sieve element hereby serves for the purpose of trapping particles which have become detached for example from a catalytic converter or particle filter in order that these cannot pass into the turbocharger. With respect to the temperatures of the fluids conducted through the gasket, it is thereby preferred that the at least one metallic layer is uncoated. Basically, the at least one metallic layer can however be provided on one or both sides, over the entire area or partially with a metallic or polymer-based coating.

In the following, the invention is explained in more detail with reference to Figures. These Figures serve exclusively for explaining preferred embodiments of the invention without the invention being restricted to these. The same parts are designated with the same reference numbers in the drawings. In addition to the essential features of the present invention, described in the independent claims, the Figures also comprise, in a different composition, optional and/or advantageous developments. Each individual one of these advantageous and/or optional developments of the invention can develop as such the invention described in the independent claims, even without combination with one, several or all of the optional and/or advantageous developments described at the same time in the examples.

BRIEF DESCRIPTION OF THE DRAWINGS

The Figures show schematically:

FIG. 1: a sectional view of the installation position of a metallic flat gasket of the state of the art between two fluid-conducting components;

FIG. 2-*a*: a sectional view of the installation position of a metallic flat gasket according to the invention between two fluid-conducting components;

FIG. 2-*b*: a sectional view of the installation position of a metallic flat gasket according to the invention between two fluid-conducting components;

FIG. 3-*a*: a plan view of a first embodiment of a metallic flat gasket according to the invention FIG. 3-*b*: a sectional view of the embodiment in FIG. 3*a* along line B-B;

FIG. 3-*c*: a sectional view of the embodiment in FIG. 3*a* along line C-C;

FIG. 3-*d*: a plan view of the at least one semi-finished metallic layer;

FIG. 4-*a*: a sectional illustration of one embodiment of a continuation forming a support portion of a metallic flat gasket;

FIG. 4-*b*: a sectional illustration of another embodiment of a continuation forming a support portion of a metallic flat gasket;

FIG. 4-*c*: a sectional illustration of another embodiment of a continuation forming a support portion of a metallic flat gasket;

FIG. 6-*a*: a plan view of a at least one semi-finished metallic layer;

FIG. 6-*b*; a sectional view through the layer of FIG. 6*a*;

FIG. 6-*c* a plan view of a component from FIG. 6*a*;

FIG. 7: a simplified sectional illustration of a metallic flat gasket according to the invention;

FIG. 8-*b*: a plan view of a finished flat gasket using the layer from FIG. 8*a*;

DETAILED DESCRIPTION OF THE INVENTION

Figure 5:
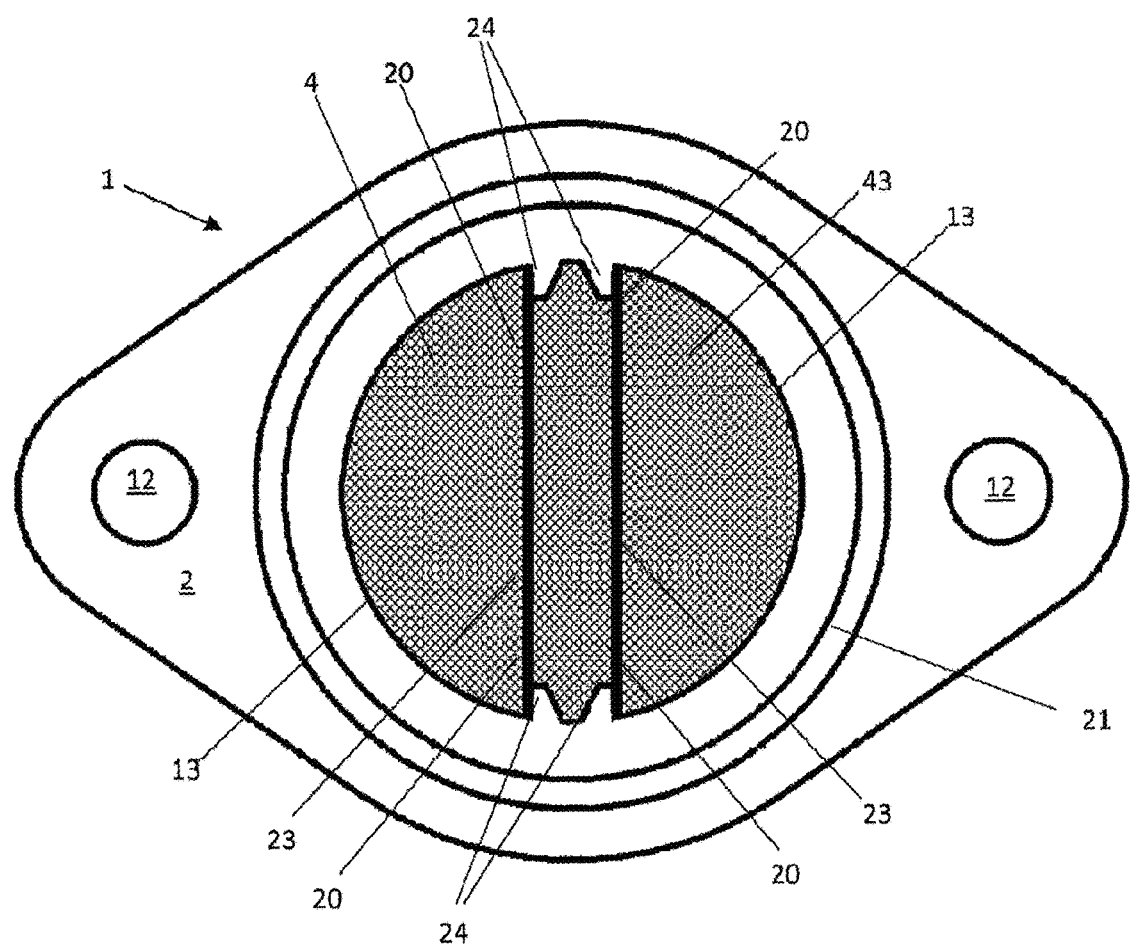
FIG. 5: a plan view of a further metallic flat gasket according to the invention.

FIG. 1 illustrates the installation position of a conventional metallic flat gasket 101 between two fluid-conducting components 160 and 170. In the fluid channel 150, a fluid, here exhaust gas of an internal combustion engine, flows in the direction of the arrow through the through-opening 111 in the metallic flat gasket 101. The through-opening is sealed by a circumferential bead 121 in the one metallic layer 102 of the metallic flat gasket 101. The through-opening 111 is spanned by a sieve element 104 which serves for the purpose of trapping particles entrained in the fluid flow and preventing the particles from being carried further towards components situated downstream and damaging these. Since the throughflow area perpendicular to the fluid flow direction is limited, a curved sieve is used instead of a perpendicular, flat sieve in order to make available a sufficiently large sieve area. Furthermore, the sieve element is designed such that the mesh width is so small that all critical particles are trapped and that the mesh width is so large that the pressure loss remains limited to a permissible extent. This sieve element 104 is curved in the throughflow direction. The sieve element 104 is however in the fluid flow and suffers deformations under long-term load. As a result, the mesh width is changed non-reproducibly so that the risk is present of the particles being able to pass through the sieve element without being filtered.

For this reason, the metallic flat gasket 1 according to the invention in FIG. 2-*a* or 2-*b*, which seals the transition of a fluid channel 50 between two components 60, 70, as can be detected in FIG. 3, has at least two continuations 20 which extend from the edge of the sheet metal layer 2 into the through-opening 11 and project from the plane E1 of the sheet metal layer 2, from which they continue, and together form a support region 23. In the two partial Figures of FIG. 2, only one continuation 20 is cut. Together with at least one further continuation, to which it is either connected or into which it merges uniformly with respect to material, it forms a support portion 23 which prevents deformation of the curved filter element 4. The sheet metal layer 2 is formed from a non-deep-drawable spring steel with a tensile strength of approx. 1,100 N/mm$^2$ so that the continuations 20 must have in total a length which makes it possible to follow the curved shape of the filter element 4. The total length must be significantly greater for this purpose than the shortest spacing of the edges delimiting the through-opening. In all the illustrated embodiments, a sealing element 21 is moulded in the sealing layer 2 of the finished metallic flat gasket 1, which sealing element is configured in particular as a half bead.

FIGS. 2-*a* and 2-*b* illustrate further that the curvature of the sieve element 4 can be directed both in flow direction of the fluid (FIG. 2-*a*) and counter to the flow direction of the fluid (FIG. 2-*b*). It is essential in both cases that the support region 23 is disposed behind the screen element 4 in the flow direction of the fluid.

A first embodiment of a metallic flat gasket 1 according to the invention is illustrated in FIG. 3 in plan view (FIG. 3-*a*) and also two sectional illustrations corresponding to the sections B-B (FIG. 3-*b*) and C-C (FIG. 3-*c*) of FIG. 3-*a*. The semi-finished sheet metal layer 2*a* with a precursor of the continuations 20 is explained with reference to FIG. 3-*d*. In FIG. 3-*d*, the outer edges of the sheet metal layer 2*a* and also the through-openings 12 for attachment means and also the fluid through-opening 11 are already punched out. A sealing element is not yet moulded-in in the illustrated state. The fluid through-opening 11 is not punched out point-symmetrically. Rather there extends, on the right side of the through-opening 11 between the cut-out through-opening 11 and the actual edge 13 of the through-opening 11, another sheet metal portion which is at a spacing, by means of a narrow gap 14, from the edge 13 of the through-opening over barely 180° of the circular circumference. The continuations 20 continue from the edge 13 of the through-opening 11 only in the connection regions 24 and merge one into the other seamlessly with formation of a continuous arc 22. For formation of the actual support region 23, this arcuate sheet metal portion formed by the continuations 20 is bent out of the plane E1 of the sheet metal layer 2 in the region abutting against the through-opening 11 by approx. 90°. This can be effected simultaneously or independently of the embossing of the sieve element. FIGS. 3-*a* to 3-*c* illustrate how the support region in the finished gasket surrounds the curved portion 43 of the sieve element in portions. This becomes clear in particular from FIG. 3-*c*. In FIG. 3-*b*, the essentially right angle about which the continuations 20 in the connection regions 24 are shaped, relative to the plane E1, are particularly obvious. FIGS. 3-*a* and 3-*b* make clear in addition that only a very narrow region of the filter element 4 is covered by the support region 23, namely a region, the width of which corresponds essentially to the sheet metal thickness of the metallic layer 2, here 0.20 mm.

The continuations 20 undergo a deflection only in the connection regions 24. A connection between the support region 23 and the sieve element 4 was dispensed with here. Hence the support region 23 has structure changes only in the connection regions 24, otherwise the structure of the spring steel sheet of the support region 23 corresponds to the structure of the region of the spring steel layer 2 surrounding the through-opening. The filter element 4 consists of a twill woven material made of stainless steel wire with a wire thickness of 0.1 mm and a mesh width of 0.18 mm.

FIG. 4 illustrates, in three partial images, different cross-sections of continuations 20 of metallic flat gaskets according to the invention, comparable to the first embodiment illustrated in FIG. 3. The variant of FIG. 4-*a* thereby corresponds to the rectangular cross-section illustrated in FIG. 3-*b*. This is advantageous with sufficiently thick sheet metal thicknesses since it is particularly easy to produce. In the case of very thin metal sheets, the result can however be damage to the filter element 4 on the inner contact surface 26. Therefore, in the case of thin sheet metal thicknesses, the variants of FIGS. 4-*b* and 4-*c* are preferred since here the free edges of the continuations 20, pointing towards the filter element 4, are bent with a significant radius so that only the rounded region on the inner contact surface 26 comes to rest on the sieve element 4. If the relevant continuation 20 extends thereby inclined, as in FIGS. 4-*b* and 4-*c*, then the bent end portion 220 can come to rest below the unbent portion of the continuation (FIG. 4-*b*) or adjacent to the unbent portion of the continuation (FIG. 4-*c*). Bent variants are however not possible even with non-inclined continuations 20.

FIG. 5 illustrates a variant of the first embodiment of FIG. 3. Here, in total four continuations 20 are present, which respectively in pairs form a support region 23. Whilst the support region 23 in FIG. 3 extends precisely through the centre of the sieve element 4, i.e. in the main flow, the two support regions 23 respectively are displaced somewhat from the centre towards the side. This position is advantageous with respect to the fluid flow. However, the two support regions or the associated four continuations 20 in their connection regions 24 are shaped by a somewhat smaller angle, namely only 70°, out of the plane E1. There results herefrom a wider covering of the sieve element 4. However, this is still very small and is far less than 5% of the filter area projected into the through-opening 11 in the plane E1 so that nevertheless an unimpeded fluid flow is made possible. Differently from the embodiment of FIG. 3, the screen element 3 here is almost completely rounded, has therefore no plateau in the plane E2.

FIG. 6 illustrates, in two partial FIGS. 6-*a*, 6-*b*, a first variant of a second embodiment of a metallic flat gasket 1 according to the invention. In FIG. 6-*c*, in addition a semi-finished sheet metal layer 2*a* for use in this embodiment is reproduced, into which however a sealing element 21 is moulded in fact differently from FIG. 3. This second embodiment is distinguished by the continuations 20 being configured independently of each other with respect to the fact that they are cut free such that a gap remains between them. However they are placed such that they are as close together as possible so that, when the continuations are curved out of the plane E1 or when the mutually overlapping free ends 201 are placed one upon the other in the overlapping region 29, the surface of the continuations extends such that its extension perpendicular to the longitudinal extension direction deviates at any point by at most 15° out of a plane parallel to the plane E1. In the overlapping region 29, the two free ends 201 of the continuations which produce the connection of the support region 23 extend essentially parallel to the plane E1.

The total length of the support region 23 in the finished gasket 1 is approx. 1.4 times the shortest spacing 18 between the edges 13 of the through-opening. Because of the arrangement of the support region 23 which is rotated by approx. 75 to 90° compared with the embodiment of FIG. 3, the width of the support region is significantly greater than a sheet metal thickness. It is approx. 2 mm and hence corresponds approx. to 10 times the sheet metal thickness, whilst the diameter of the through-opening is approx. 40 mm.

In FIG. 7, both the position of the different planes of the metallic flat gasket 2 according to the invention and different regions of the filter element 4 are illustrated more precisely. The plane E1 extends in the sheet metal layer 2 from which the continuations protrude into the through-opening 11, at least in the edge region of the through-opening 11, in the neutral fibre of this sheet metal layer. The plane E4 represents, in contrast, the plane in which the continuations 20 are connected to each other in the second embodiment of the invention illustrated here. Hence the plane here relates to the interface between the two continuations 20. In the first embodiment of the invention, the transition between the two continuations 20*n* is effected in the fourth plane E4, as is indicated in FIG. 3-*c*. There, the plane E4 relates to the neutral fibre. The filter element 4 consists in particular of an edge region 45 which extends in a third plane E3 and also of a curved region 43 which includes the entire portion of the filter element 4 protruding from the plane E3. The portions of the filter element 4 which are deflected furthest extend in the plane E2. Also in the case of the filter element 4, the planes relate respectively to the neutral fibre.

FIG. 8 illustrates a variant of the second embodiment of the metallic flat gasket 1 according to the invention. FIG. 8-*a* thereby shows the semi-finished sheet metal layer 2*a*, FIG. 8-*b* shows the finished gasket 1. In turn, the two continuations 20 in the semi-finished sheet metal layer 2*a* extend essentially parallel to each other and are separated from each other by a narrow gap 14. The continuations 20 do not thereby have a rectangular shape, differently from FIG. 6-*c*, but rather deviate arcuately after approx. ¼ of their length, in the direction at a spacing from the respectively other continuation before they return, after a further approx. 25% of their course, back to the original direction. At their free ends 201, they have respectively a rounded portion which is widened relative to the other course of the respective continuation. The respective widened free ends 201 result from the arcuate recesses 205. The gap 14 between the two continuations has an essentially constant width over its entire length.

In the finished gasket 1, the two widened free ends 201 are placed one above the other and connected together, with formation of an overlapping region 29. The continuations 20 forming the support region 23 are thereby raised out of the plane E1. The connection between the respective centres of the two connection regions 24 defines the extension direction of the continuations 20. A cross-section through a continuation 20 perpendicular to the extension direction of the continuation 20 always extends here almost parallel to the plane E1. The embodiment of FIG. 8 is hence particularly preferred since it makes possible a particularly stable support of the curved portion 43 of the filter element 4.

An illustration of the connection between the two free ends 201 of the continuations 20 in its overlapping region 29 was dispensed with here. In addition to a weld joint, as is given in the example of FIG. 6, a rivet connection is possible here also, since the enlarged overlapping region 29 provides sufficient space for this.

Figure 9:
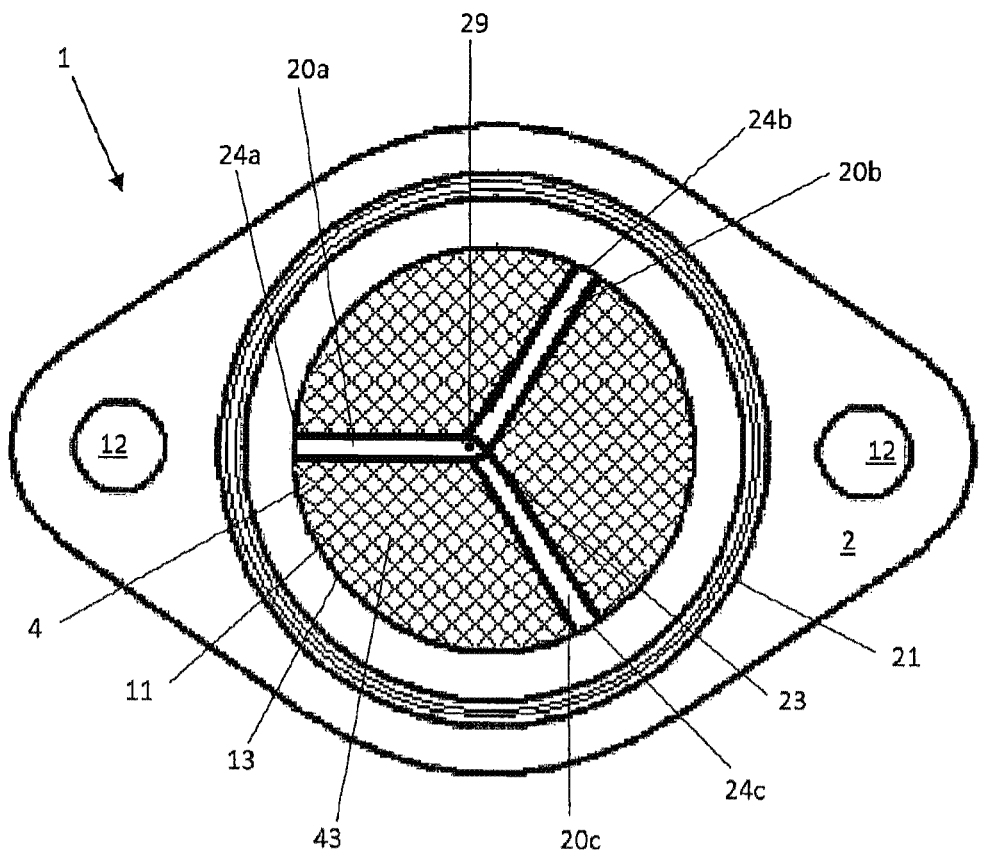
FIG. 9: a plan view of a further metallic flat gasket.
Figure 10:
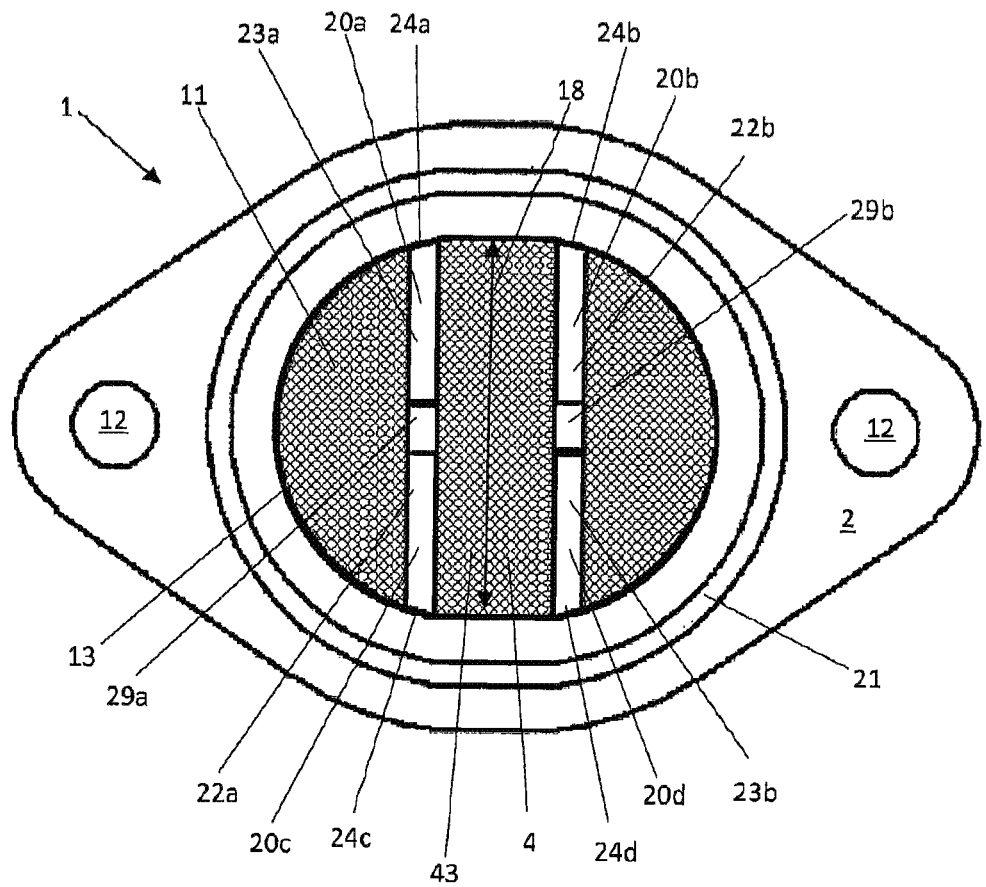
FIG. 10: a plan view of a further metallic flat gasket.
Figure 11:
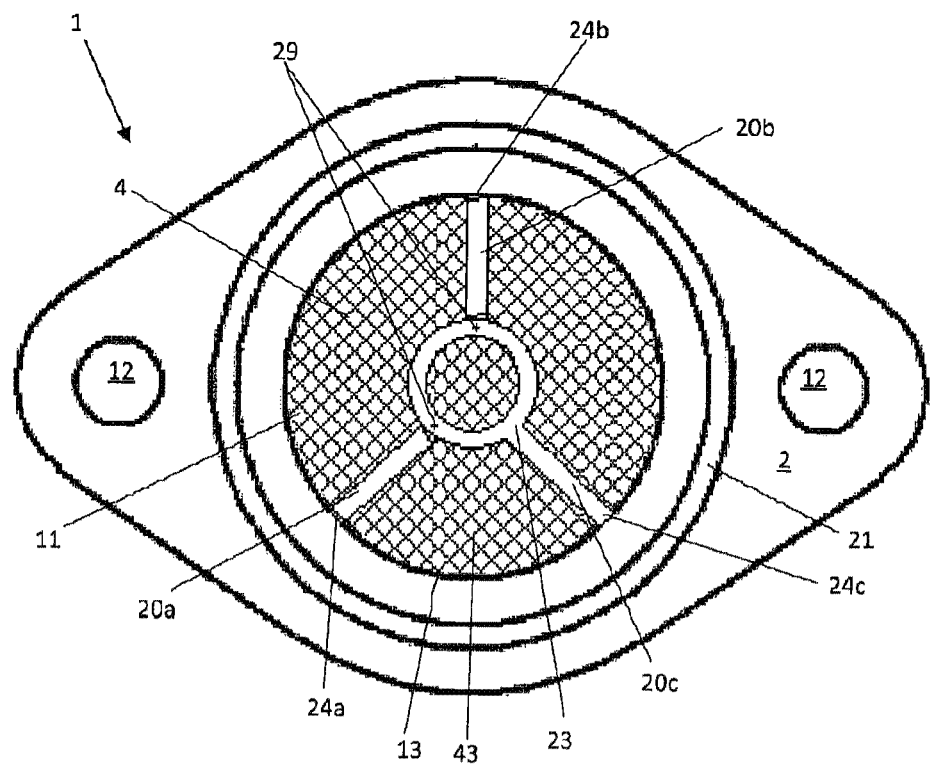
FIG. 11: a plan view of a further metallic flat gasket.

FIGS. 9 to 11 show further variants of the second embodiment of the metallic flat gasket according to the invention. These have respectively more than two continuations 20, namely three continuations 20a to 20c in the examples of FIGS. 9 and 11 and four continuations 20a to 20d in the example of FIG. 10.

In the embodiment of FIG. 9, three continuations 20a, 20b, 20c protrude from the edge 13 of the layer 2 which consists here of a nickel-based alloy, into the through-opening 11 and curve, on the upper side of the curved region 43 of the sieve element 4, orientated towards the observer, likewise towards the observer. The continuations are cut free out of the sheet metal layer 2 such that, with a small inclination in the connection regions 24a, 24b, 24c, they come to rest one upon the other in the overlapping region 29, the continuation 20a being situated uppermost. The connection in the overlapping region 29 is produced via a weld point. As a result of the three-sided connection of the support region 23, the curved region 43 finds particularly good support so that the danger of elongation is effectively avoided. Because of the narrow continuations 20a, 20b, 20c, no impediment for the fluid flow is produced in the centre of the fluid flow despite the position of the overlapping region 29.

The gasket 1 of FIG. 9 differs further from the preceding embodiments by, instead of a half bead, now a periodic sealing element 21 being embossed into the single sheet metal layer 2. Instead of a twill woven material, now a plain woven material is realized in the sieve element 4, it consists in turn of a stainless steel wire.

Whilst the gaskets of the preceding embodiments all have a circular through-opening 11, in FIG. 10 an oblong-shaped through-opening 11 is present, this is spanned by a curved sieve element 4 which is supported on its side, orientated away from the fluid flow, by two support regions 23a, 23b. The support regions 23a, 23b are composed respectively of two continuations 20a, 20c or 20b, 20d, which are connected in pairs in an overlapping region 29a, 29b to form an arc 22a, 22b. The support regions 23a, 23b are configured thereby in principle like the single support region 23 of the embodiment of FIG. 6. In the case of gaskets, the through-opening of which, with respect to the ratio of length to width, is even more extreme, i.e. further elongated, it is also possible to dispose even more than two support regions comparably to the support regions 23a, 23b. The same also applies for the support regions comparable to those of FIG. 4.

The support region 23 of the embodiment of FIG. 11 differs from that of FIG. 9 by consisting not only of three essentially rectangular continuations 20a, 20b, 20c but also another annular connection being moulded onto the continuation 20c and coming to rest, in the curved state of the continuations 20a, 20b, 20c, on the free ends of the two continuations 20a, 20b and being connected to these via a weld joint. Consequently it is avoided that the centre of the through-opening, in which normally the greatest flow speeds are set, is covered by the support region 23.

Figure 12:
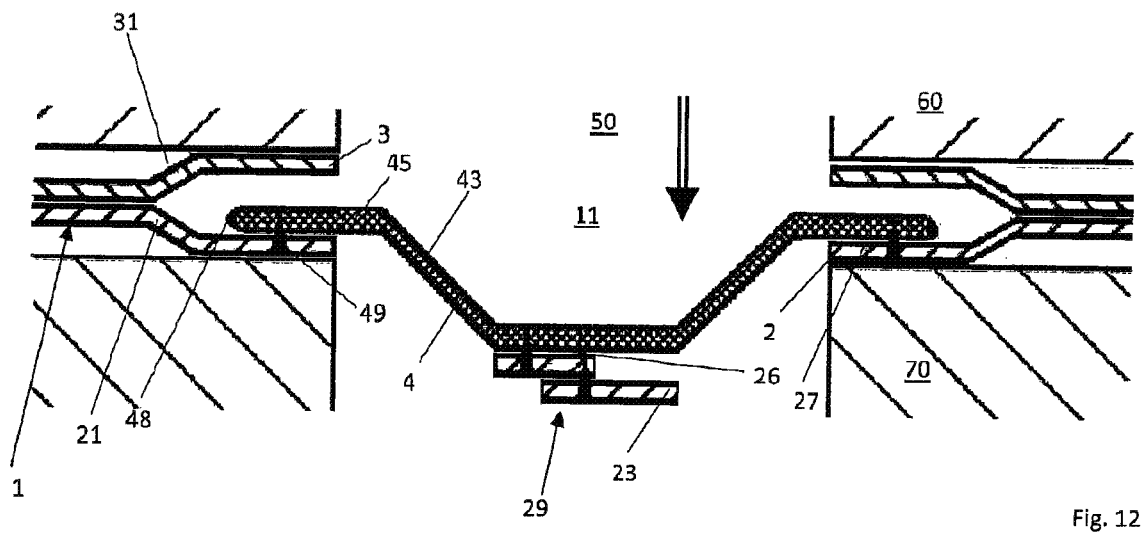
FIG. 12: a sectional illustration of a further metallic flat gasket according to the invention between two fluid-conducting components.

FIG. 12 illustrates a further design possibility of a metallic flat gasket 1 according to the invention in an illustration analogous to FIG. 2. In contrast to the preceding examples, this has not only one but two sheet metal layers 2, 3 in which respectively one half bead 21, 31, which surrounds the through—opening 11, is moulded. The edge regions of the two sealing layers 2, 3 thereby come to rest one on the other. The sieve element 4 is received between the two layers 2, 3 and serves also as deformation-limiting element for the beads 21, 31. The edge region 48 of the sieve element 4 is compressed so that no wires can become detached from the filter woven material. The sieve element is connected both to the sheet metal layer 2 via a weld joint in the outer contact region 27 and in the inner contact region to one of the continuations 20. Also the continuations 20 are connected to each other by means of a laser weld joint in order to form the support portion 23 in its overlapping region 29.

All of the illustrated examples of metallic flat gaskets according to the invention are suitable for various purposes of use in which a flat gasket, in addition to its actual sealing task, is also intended to take over filtering tasks. The metallic flat gaskets according to the invention are particularly suitable in the field of hot gases, in particular exhaust gases and thereby preferably as gasket in the field of exhaust gas recirculation.

The invention claimed is:

1. A metallic flat gasket, comprising at least one metallic layer,
    the at least one metallic layer having at least one through-opening which is covered by a sieve element,
    a region of the at least one metallic layer directly adjacent to the through-opening extending in a first plane,
    the sieve element comprising a mesh material, having a curved portion which is curved up to a second plane, and having an edge portion which annularly surrounds the curved portion and extends, at least in portions, in a third plane, the second plane being different from the third plane,
    wherein the at least one metallic layer has at least two continuations which extend from an edge of the through-opening into a region of the at least one metallic layer directly adjacent to the through-opening, the at least two continuations being curved such that the at least two of the continuations merge into each other or are connected to each other in a fourth plane, the first plane being different from the fourth plane.

2. The metallic flat gasket according to claim 1, wherein at least two of the at least two continuations of the at least one metallic layer are connected together by at least one support portion, the support portion disposed within the through-opening or bridging the through-opening.

3. The metallic flat gasket according to claim 2, wherein the curved portion is supported, at least in portions, on the at least one support portion, with formation of an inner contact region.

4. The metallic flat gasket according to claim 1, wherein the edge portion of the sieve element is supported, at least in portions, on the at least one metallic layer, with formation of an outer contact portion.

5. The metallic flat gasket according to claim 1, wherein the sieve element, in the region of its edge portion, is connected to at least one of the one metallic layer or in a positive form fit.

6. The metallic flat gasket according to claim 5, wherein the at least one through-opening is surrounded, outside the connection portion, by a sealing element moulded in the at least one metallic layer, the sealing element selected from a bead or a half bead.

7. The metallic flat gasket according to claim 1, wherein the at least one metallic layer is selected from a steel or a nickel-based alloy, or comprises steel or an alloy, and the tensile strength of the steel or of the nickel-based alloy is at least 900 N/mm$^2$.

8. The metallic flat gasket according to claim 2, wherein the area of the continuations forming the at least one support portion transversely to the extension direction of the continuations, the at least one support portion extends at an angle of −25° to 25° with respect to the first plane.

9. The metallic flat gasket according to claim 8, wherein the at least one support portion, upon projection into the first plane, has a minimum width over its entire course, which is at least five times the thickness of the at least one metallic layer.

10. The metallic flat gasket according to claim 9, wherein a width of the at least one support portion changes in the course of the support portion.

11. The metallic flat gasket according to claim 8, wherein the at least two continuations overlap in portions, and are connected together integrally in the region of this overlap, in particular by welding, or in a positive form fit or by a connection structure.

12. The metallic flat gasket according to claim 1, wherein the sieve element and the at least one support portion in portions are connected together integrally in the inner contact region.

13. The metallic flat gasket according to claim 1, wherein the second plane and the third plane have a spacing from each other which is between 15% and 55% of the smallest spacing of the side edges of the through-opening.

14. The metallic flat gasket according to claim 2, wherein upon projection of the total area of the at least one support portion into the first plane, the total area of the support portion is at most 10% of the area of the sieve element projected into this plane.

15. The metallic flat gasket according to claim 1, wherein the sieve element comprises, at least in portions of a woven material, the woven material selected from a steel wire or a stainless steel wire.

16. The metallic flat gasket according to claim 5, wherein the sieve element, in the edge portion and outside the connection portion, has a wire thickness of 0.04 to 0.2 mm.

17. The metallic flat gasket according to claim 1, wherein the sieve element is compressed at its outer edge, at least in portions.

* * * * *